July 3, 1962     D. W. NORWOOD     3,041,929
LIGHT VALVE STRUCTURE

Filed May 18, 1959     2 Sheets-Sheet 1

DONALD W. NORWOOD,
INVENTOR.

BY William P. Green
ATTORNEY.

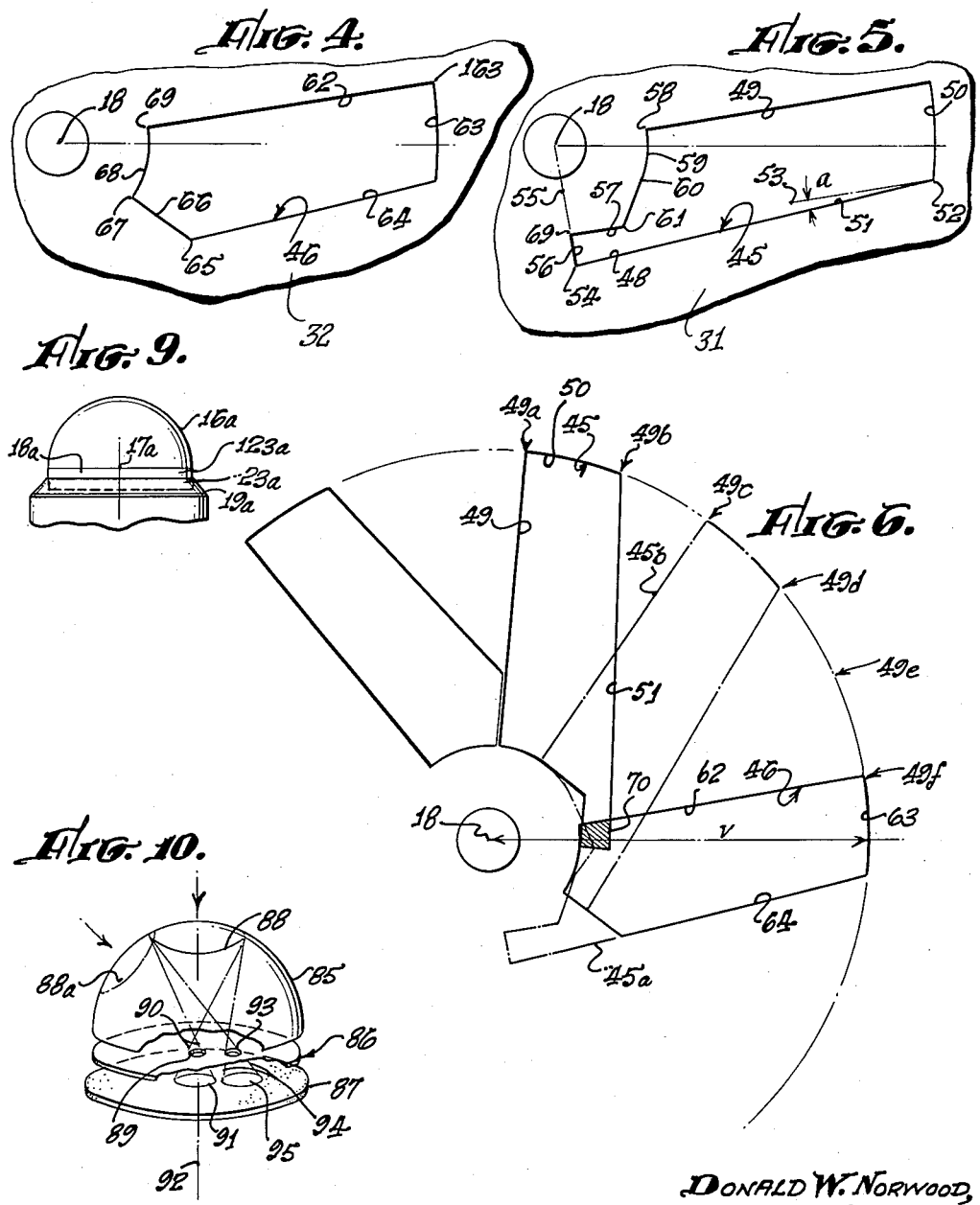

United States Patent Office 3,041,929
Patented July 3, 1962

3,041,929
LIGHT VALVE STRUCTURE
Donald W. Norwood, 1470 San Pasqual St.,
Pasadena, Calif.
Filed May 18, 1959, Ser. No. 813,752
12 Claims. (Cl. 88—23)

This invention relates to improved light valve arrangements for use in light actuated photographic devices. For example, a valve structure embodying the invention may typically be used in a photographic light meter, and will be described herein as applied to that use. However, it will be apparent that the novelty of the invention is also applicable to other types of light actuated photographic devices. In certain respects, the invention is especially useful in an incident light type of light pick-up arrangement, such as those shown in my U.S. Patent No. 2,214,283, and my U.S. patent applications Serial No. 798,459, filed March 10, 1959, now U.S. Patent No. 2,983,186, and Serial No. 749,844, filed July 21, 1958, now U.S. Patent No. 2,972,930.

A light valve assembly constructed in accordance with the invention includes two closely proximate essentially parallel plates, which are connected together for relative rotary adjusting movement about an axis extending essentially perpendicular to the plates. These plates contain apertured areas which move into and out of registry in response to relative rotary adjustment of the plates, to thereby vary the effective light passing area of the overall two-plate assembly. Preferably, the valve is interposed axially between a translucent light collector dome and a photo-cell, to control the amount of light passing from the dome to the cell.

In a device utilizing a light collector dome of this type, the light passing from the dome to the photocell does not travel along any single path or in any single direction, but instead follows an infinite number of diverse paths from different locations on the dome surface toward different portions of the photocell. Since both the translucent dome and the photocell have extended surface areas, the interior light ray pattern of a system of this type is theoretically very complex and difficult to analyze thoroughly. This complexity is increased when an attempt is made to take into account the changes which occur in the light ray pattern upon a change in the positioning of an external light source relative to the translucent light collector dome. Under front lighting conditions, the dome is illuminated in a first manner, and the rays from the dome to the photocell form a first characteristic light ray pattern, whereas under side lighting or back lighting conditions, the primary illumination of the dome surface shifts to a different location, and the interior light ray pattern between the dome and photocell changes correspondingly.

This complexity in the interior light ray pattern of such a dome and photocell arrangement makes it very difficult to design a light valve which can be interposed axially between the dome and the photocell, and which will predictably control the passage of light from the dome to the photocell, in a manner such that for each setting of the valve, the valve will pass a predetermined percentage of the available light from the dome to the cell, irrespective of whether the dome is illuminated under front lighting, side lighting, or back lighting conditions. With this in mind, the general object of the present invention is to provide an improved valve which will in fact attain this predictability and reliability under all possible lighting conditions. Of particular importance in designing this valve is the positioning of the apertures at locations such that substantially all of the light rays passing through those apertures are certain to fall on the effective area of the photocell, particularly in the settings in which the valve passes only a very small proportion of the available light.

A further object of the invention is to provide a valve arrangement having the features discussed above, and in which the range of adjustment of the light passing characteristics of the valve is relatively wide, as between the maximum light passing condition and the minimum light passing condition, the ratio between the amounts of light passed in these two conditions preferably being as great as about 32 to 1. In addition, it is a purpose of the invention to so design the valve that the transmission of light by the valve increases in steps corresponding to a geometric progression, even though the actual relative rotation of the two apertured plates of the valve is effected in arithmetic progression steps. This feature is of considerable importance in a photographic device, in which f-stop values for a camera also represent a geometric progression.

The above and other features and objects of the present invention will be better understood from the following detailed description of the typical embodiments illustrated in the accompanying drawings, in which:

FIGS. 4 and 5 are greatly enlarged representations of the two types of apertures which are provided in the two plates of the light valve in the FIG. 1 device;

FIG. 6 is a diagrammatic view representing the relative positioning of the apertures in different settings of the valve;

FIG. 9 represents another variational form of the invention; and

FIG. 10 is a diagrammatic view representing the manner in which the light rays diverge in a valve-controlled incident light device.

Figure 1:
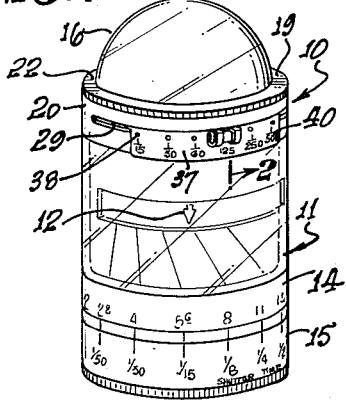
FIG. 1 is a perspective view of a photographic light meter having a light handling system and valve constructed in accordance with the invention.

In the drawings, I have typically shown the light valve arrangement of the invention as applied to a photographic light meter 10, which may be basically the same as the device disclosed and claimed in my copending application Serial No. 749,844, filed July 21, 1958, now U.S. Patent No. 2,972,930. This meter is essentially cylindrical, as seen clearly in FIG. 1, with one portion of the side wall of the meter taking the form of a cylindrical transparent element 11 through which the movable electrically actuated pointer 12 of an inner microammeter 13 is visible. The positioning of pointer 12 is readable on a rotatably adjustable f-stop scale 14, to indicate a proper lens aperture setting for a camera under particular lighting conditions to which the meter may be subjected. Scale 14 can be set to different positions corresponding to different film sensitivities, and the versatility of the device can be extended by providing a second adjustable scale 15 beneath scale 14 and reading in terms of shutter times.

Figure 2:
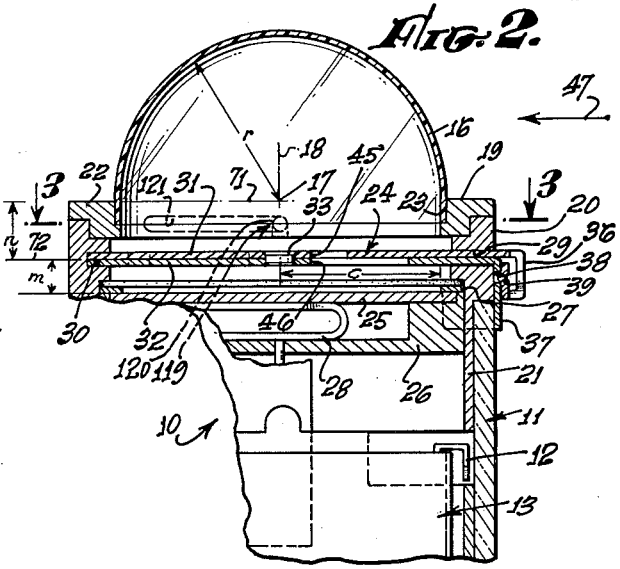
FIG. 2 is an enlarged fragmentary axial section taken on line 2—2 of FIG. 1.

At its upper end, as viewed in FIGS. 1 and 2, the body of meter 10 carries a light acceptance unit, preferably taking the form of a translucent hemispherical dome 16, which is centered about a point 17 located on the main axis 18 of the cylindrical body of the meter.

Dome 16 is cemented or otherwise rigidly secured to an opaque carrier ring 19, which is in turn detachably secured to an opaque annular part 20 by means of two bayonet connections 119. These connections 119 typically include two diametrically opposed pins 120 carried by part 20 and receivable within two bayonet grooves 121 formed in part 19. Part 20 has an annular downwardly projecting portion 21 receivable within an upper portion of transparent part 11, and rigidly secured thereto.

The center 17 of hemispherical dome 16 is typically illustrated as being located in the transverse plane of the upper surface 22 of part 19, with the dome having a mounting portion 23 projecting into and secured to ring 19. The dome may be formed of any suitable translucent material, for example a suitable milky appearing resinous plastic material, typically cellulose acetate. This translucent material is illuminated by any light rays which fall on the dome 16, and that light is then transmitted through the thickness of the dome to its interior, from which the light is transmitted downwardly (as viewed in FIG. 2) through a valve 24 constructed in accordance with the invention, and to a photovoltaic cell 25. It is contemplated that dome 16, instead of being a precisely hemispherical element as shown, could possibly be formed of a large number of small planar surfaces forming together a polyhedron having a convexity corresponding substantially to that of a hemisphere. It is also contemplated that, in accordance with the teaching of my copending application Serial No. 798,459, filed March 10, 1959, now U.S. Patent No. 2,983,186, the dome 16 may have an axially extending inner base portion located inwardly beyond the hemispherical portion of the dome, and exposed for the transmission of light therethrough. This arrangement is shown in FIG. 9, in which the dome 16a has an outer hemispherical portion centered about a point 17a, and has an annular straight cylindrical portion 123a centered about main axis 18a of the device. A portion 23a of the dome projects into and is mounted rigidly within carrier ring 19a.

The photocell 25 of FIG. 2 takes the form of a flat circular disc, which is centered about axis 18 and disposed transversely thereof, and which is nested within a recess formed in a part 26 rigidly attached to element 21 and the other portions of the body of the device. Disc 25 is peripherally engaged at its upper side by an annular opaque electrical contact ring 27, which is centered about axis 18. At its under side, photocell 25 is engaged by a second electrical contact 28, with the two contacts 27 and 28 being electrically connected to microammeter 13, to actuate the pointer 12 of that microammeter in correspondence with the light energization of cell 25. As will be apparent, the radius of the effective light responsive surface of photocell 25 is the dimension designated $c$ in FIG. 2, extending from axis 18 to the inner edge of opaque ring 27.

The present invention is in certain respects particularly concerned with the construction of light valve 24, which controls the passage of light from the inner surface of dome 16 to cell 25. This light valve 24 takes the form of an essentially circular flat valve assembly which is insertable transversely of axis 18 through a slot 29 formed in one side of part 20, and to the active position represented in FIG. 2. When the valve assembly is in this active position, the entire periphery of the valve is confined in fixed axial position relative to part 20 and the rest of the meter structure, with approximately one-half of that periphery being received within slot 29, and the other half of the periphery of the valve being received within a semi-circular recess 30 formed in the inner wall of part 20 at a side opposite slot 29. In lieu of this detachable slide type of mounting for valve 24, it is contemplated that the valve 24 may be mounted in the device in any other suitable manner, so long as the manner of mounting is such as to allow for adjustment of the valve in the manner to be discussed below.

Valve 24 takes the form of two parallel, preferably planar plates 31 and 32, which are pivoted together by means of a central rivet 33 for relative rotation about axis 18. When the valve is in its FIG. 2 active position, these two plates both extend directly transversely of axis 18. Plate 32 is so shaped as to be retained by slot 29 against rotary movement relative to the body of the meter, while the shape of plate 31 is such as to allow relative rotation of that plate about axis 18 through a predetermined range of movement. To attain this result, plate 31 is defined peripherally by an edge 34, which is circular except at the location of a laterally projecting actuating lug or ear portion 35 of plate 31. Edge 34 is centered about axis 18, and is of a diameter to fit closely within the previously mentioned semi-circular recess 30 in part 20, and be rotatable within that recess. Lug 35 projects outwardly through slot 29, and has an outer portion 36 which is deformed to form a manually movable actuating element coacting with an axially turned flange 37 on plate 32 to indicate the setting of the valve. Flange 37 of part 32 is curved arcuately to engage and conform to the outer cylindrical surfaces of parts 11 and 20, and contains a series of uniformly circularly spaced apertures 38 into which a detent lug 39 formed by portion 36 of plate 31 projects. The material forming plate 31 is sufficiently resilient to yieldingly urge projection 39 into any of the various apertures 38, to form a spring detent for releasably retaining the valve in any desired setting. Markings 40 are provided on the outer surface of flange 37 on plate 32, with one such marking being located opposite each of the apertures 38, to indicate the different settings of the valve.

Figure 3:
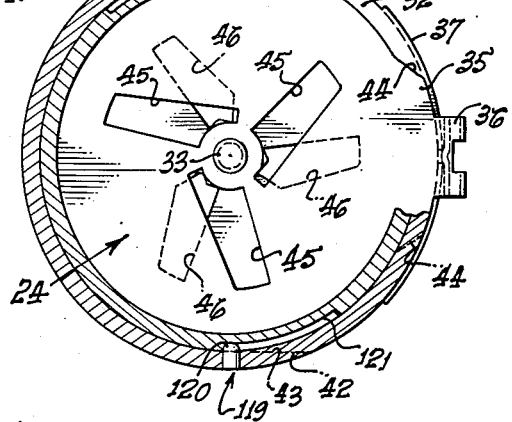
FIG. 3 is a transverse section, partially broken away, taken on line 3—3 of FIG. 2.

To retain plate 32 against rotation relative to the meter body, this plate is shaped to occupy the full circular extent of slot 29, as seen best in FIG. 3. That is, the plate has a portion 41 projecting through slot 29, which portion has two parallel opposite side edges 42 engageable against two parallel opposite side walls 43 of slot 29 to prevent rotation of plate 32 in either direction. Lug 35 of plate 31, on the other hand, has a circular extent which is considerably less than the circular extent of slot 29, to allow for the desired relative rotation of plate 31. More particularly, lug 35 of plate 31 is defined at its opposite sides by two angularly extending side edges 44 of lug 35, which edges 44 are engageable against the two shoulders 43 respectively in the two extreme positions of plate 31, to limit the range of rotation of plate 31 relative to plate 32.

Plate 31 contains several (preferably three) apertures 45, which are evenly circularly spaced about axis 18, and which may be identical with one another. Similarly, the other plate 32 contains three evenly circularly spaced apertures 46, which are identical with one another, but are shaped differently than apertures 45. Except at the locations of apertures 45 and 46, plates 31 and 32 are opaque, typically being formed of an opaque metal. Consequently, light is permitted to pass through the valve assembly 24 only at the locations at which the apertures 45 register with apertures 46, so that relative rotation of plate 31 varies the effective overall light transmitting capacity of the valve assembly.

The shaping and positioning of apertures 45 and 46 has proven to be of critical importance in assuring optimum functioning of the valve under the many different conditions of illumination which may be encountered in using the device. The aperture configurations shown in FIGS. 3 through 6 are the result of an extended period of study and development. A major problem which was encountered during that development period was the problem of so designing the apertures as to make certain that, under all possible lighting conditions, and in all settings of the valve, a maximum percentage of the light passing through the valve will definitely fall on the effective surface area of photocell 25.

In this connection, it will be understood that the translucent, hemisphere type light collector receives exterior light, and transmits said light through the shell in such manner that the interior surfaces of the shell appear as light sources for the interior cavity of the assembly. The cosine law applies to the intensity of illumination received on the curved exterior surface of the light collector. Consequently the area of intense transmitted illumination, when viewed from the inside, appears to be limited to a disk, at the edges of which the intensity falls off rather rapidly.

A study of the interior-photometry of the assembly shows that the illumination from the disk of interior light projects through the ports in the valve, and if the device is designed properly, then falls onto the cell surface. In the case of exterior front light the interior light source disk is centered on the axis of the light collector. If the port in the valve is off center from the light collector axis, the axis of the interior beam of light which passes through the port is radially divergent from the light collector and cell axis. In the case of exterior side or back light, the center of the interior light source is displaced from the light collector axis by an amount which is dependent on the angle between the exterior illumination axis and the light collector axis. This effect in turn compounds the divergence of the internal beams from the light collector and cell axis. Furthermore, in the case of back-lighting the above referred to disk of interior light is formed into the shape of a portion of a disk. These effects create quite a problem in that some of the rays may be so directed by the valve port, under certain conditions, that they will not arrive on the effective area of the cell.

FIG. 10 represents graphically the above discussed problem which is caused by radial divergence of the light rays with respect to the axis of the device. This figure shows a dome 85, valve assembly 86, and photocell 87, and illustrates the manner in which the light rays flare between the valve and photocell when certain different types of apertures are provided in the valve, and under different lighting conditions. First of all, when the dome 85 is illuminated under direct front-light conditions, the area of intense illumination of the cell appears as a lighted disc 88. If only a central aperture 89 is provided in valve 86, the rays from opposite sides of this disc pass through that aperture and then flare as represented at 90, so that the lighted area 91 on cell 87 is of a diameter considerably greater than that of the aperture itself. If the aperture is offset from axis 92, as for instance to the point 93, there is flare of the light rays 94 after passing through the aperture. In addition there is radial divergence of the axis of the beam of light rays outwardly from the axis of the light collector, valve and cell, and the lighted area 95 on cell 87 is offset from the axis more than is aperture 93. Under side lighting or back light conditions, this effect is even further increased because the disc of intense illumination is itself shifted laterally, as to the location represented at 88a, causing the axis of the light beam to diverge even more with respect to the axis of the light collector 85, the valve 86 and cell 87.

In order to counteract the above discussed effects of flare of the light rays and varying radial divergences of the axes of the light beams, I have found it desirable that the apertures be so designed that their registering portions will not, in any setting of the valve, extend as far radially outwardly from axis 18 as does the exposed light sensitive surface of cell 25. On this point, a formula has been developed which defines rather precisely the preferred relationship between the maximum effective aperture radius and the radius of cell 25. In addition, it has been determined that, in the minimum light transmission condition of the valve, the registering light passing portions of the apertures 45 and 46 should be located as close to axis 18 as is practical, since the total amount of light passing through the valve in this minimum light passing condition is very small, and it is therefore extremely important in that condition, that none of this light be permitted to flare or diverge to a point radially beyond the effective surface of photocell 25.

FIG. 5 represents in greatly enlarged form the precise configuration of one of the apertures 45 in disc 31. This aperture 45 is elongated in a direction extending essentially radially outwardly from axis 18 of the device. At its inner end, aperture 45 is shaped to form a portion 48 of the aperture which projects circularly with respect to axis 18, and which is the portion of aperture 45 designed to register with or be received opposite the coacting aperture 46 in the minimum light transmission condition of the valve. The exact configuration of aperture 45 can be best defined by first referring to one side edge 49 of the aperture. This edge 49 desirably extends directly radially outwardly with respect to axis 18. At the outer end of edge 49, aperture 45 may have an outer edge 50, extending arcuately about axis 18, and preferably through about 15 degrees. The second side edge 51 of aperture 45 extends inwardly from point 52 at the end of arcuate edge 50, desirably in a direction to flare slightly away from the opposite edge 49 as the two edges advance radially inwardly toward axis 18. This flare should be relatively slight. In the optimum relationship edge 51 extends at an angle $a$ of three degrees and forty-five minutes with respect to a line 53 extending parallel to radial line 49. Edge 51 continues to a point 54 at which it is substantially directly perpendicular to a line 55 extending directly radially outwardly from axis 18. From the point 54, the inner end of projection 48 is defined by a short edge 56 which extends along the radial line 55. A second side of projection 48 is then formed by a short edge 57, desirably extending parallel to the first discussed side edge 49, and therefore converging slightly with respect to edge 51. From the inner end 58 of edge 49, there extends an edge 59, which is curved arcuately about axis 18 to a point 60, and which then extends as a straight line to its point of intersection at 61 with edge 57. This straight portion of edge 59, between points 60 and 61, may extend at an angle of 120 degrees with respect to edge 49.

FIG. 4 represents the preferred configuration of each of the apertures 46 of plate 32. These apertures 46 are of essentially the same size and shape as apertures 45, except that the circularly projecting portion 48 has been deleted from apertures 46. More specifically, each aperture 46 has a first radially extending side edge 62 corresponding exactly to edge 49 of aperture 45. Also, the outer arcuate edge 63 of aperture 46 the same as edge 50. At the opposite side of aperture 46, this aperture has an edge 64, which extends at the same angle as edge 51 of aperture 46, but which terminates at a point 65. From this point, aperture 46 has an edge 66 which extends directly radially with respect to axis 18, and which meets at point 67 an edge 68 curved arcuately about axis 18. Edge 66 desirably extends at an angle of 45 degrees with respect to edge 62.

The radial distance of edge 68 from axis 18 should correspond to the radial distance of the curved portion of edge 59 of aperture 45 from axis 18. Also, it is preferred that point 69 at the intersection of edges 56 and 57 in aperture 45 be spaced this same radial distance from axis 18. The common radius of the two outer edges 50 and 63 of the apertures should be at least about four times as far from axis 18 as are the points 58 and 69, and edge 68. In one highly effective arrangement which has been thoroughly tested and found very successful, the radius of outer edges 50 and 63 is .391 inch, while the radial distance of points 58 and 69, and edge 68, from axis 18 is .094 inch.

FIG. 6 shows in full lines two of the apertures 45 and 46, relatively adjusted to their minimum light transmission condition. In this setting of the valve assembly 24, the only portion of aperture 45 which registers with any part of aperture 46 is the small shaded area 70 at the extremity of projection 48 of aperture 45. Thus, the only points at which light can pass through the valve are three small circularly spaced areas such as that shown in 70, at which the three sets of coacting apertures register. For the sake of clarity in this discussion of the various settings of the valve, the registering areas of the apertures (for example area 70 in FIG. 6) will be referred to as ports, while the term aperture will be reserved for use in designating the openings 45 and 46 of the plates.

Since it is only the inner projection 48 of aperture 45 which registers with aperture 46 in the FIG. 6 minimum light transmission condition of the valve, the ports 70 in this setting of the valve are located very close to axis 18, and it is therefore certain that all of the light passed through these ports 70 will impinge upon the exposed surface of photocell 25. This feature is very important in assuring proper and reliable functioning of the valve in its low transmission settings, in which settings the loss of a small amount of light can adversely affect the reading of the meter to a very substantial extent.

As the disc 31 and its contained apertures 45 rotate in a clockwise direction from the aperture position represented in full lines in FIG. 6, the portion of aperture 45 which registers with aperture 46 progressively increases in size, until the aperture 45 reaches a final position represented in broken lines at 45a, in which position the edges 49, 50 and 51 of aperture 45 coincide with edges 62, 63 and 64 of aperture 46. This is the maximum open position of the valve. In the maximum open position of the valve, edge 49 of aperture 45 is located at the point designated 49f in FIG. 6. In the minimum light transmission position represented in full lines in FIG. 6, edge 49 is located at the point designated 49a. One intermediate position is represented in broken lines at 45b, in which position edge 49 is located at the point 49c. Other intermediate positions of edge 49 are designated 49b, 49d, and 49e, with all of the six positions represented being uniformly spaced, so that disc 39 is turned through exactly the same angular distance (15 degrees) in advancing from each of the various positions indicated to the next successive position, that is, from position 49a to position 49b, from position 49b to position 49c, etc. Thus, the rotary advancement steps represented by positions 49a, 49b, 49c, etc. constitute an arithmetic progression.

The unique design of the apertures, however, causes the size of the ports 70 formed by the registering portions of the apertures 45 and 46 to increase in geometric progression steps, as the aperture 45 is turned between the various positions 49a, 49b, 49c, etc. Stated differently, as edge 49 advances from position 49a to position 49b, port 70 doubles in area, and consequently the amount of light passed through the valve doubles. Similarly, in advancing from position 49b to position 49c, the area of port 70 again doubles, and the same is true of each successive step until the ultimate position 49f is reached. This increase in light transmission in geometric progression steps, while the valve element 31 is actually only advanced through arithmetic progression steps, is of considerable practical importance in giving the device optimum light controlling characteristics for use in a photographic device. The resultant ratio between maximum and minimum port size or light transmission capacity is 32 to 1 in the illustrated arrangement, giving the valve device a very wide range of adjustability for use under widely varying lighting and photographic conditions.

A feature of considerable importance resulting from the unique configuration of the apertures resides in the pattern which the port 70 follows in enlarging, when valve plate 31 is moved from its minimum light transmission position to its maximum light transmission position. Specifically, it is noted that the port first enlarges primarily in a circumferential direction (about axis 18) during an initial portion of the valve movement, following which the port 70 then enlarges primarily radially, and then during the final portion of the valve movement, port 70 again enlarges essentially circumferentially until the maximum port size position is reached. To bring this out in greater detail, assume that port 45 is in the position in which edge 49 is at the point 49a, and that the edge 49 is then advanced to position 49b. During this advancement, projection 48 of aperture 45 progressively advances circularly about axis 18, to enlarge port 70 primarily in a circumferential direction. This circumferential extension of the port continues to the position 49c, which is designated in broken lines at 45b. During the subsequent continued rotary advancement of edge 49 through positions 49d and 49e, projection 48 moves beyond edge 66 of aperture 46, as seen in FIG. 3 for example, so that the rapid circumferential extension of port 70 ceases. However, during this period of advancement through positions 49d and 49e, port 70 enlarges radially outwardly at a relatively rapid rate, until corner 52 of aperture 45 coincides with corner 163 of aperture 46. At this point, there can be no further radial extension of port 70, but instead the port commences to again enlarge primarily in a circumferential direction as the two apertures move into a position of maximum registry.

As the valve approaches its fully opened condition, it is slightly less important than in the minimum transmission condition that absolutely all light rays passing through port 70 be assured of falling on the exposed portion of photocell 25. This is true because the total amount of light transmitted increases relatively rapidly, and therefore the escape of a few of the light rays becomes less and less significant. However, it is important that, even as the maximum light transmission condition is approached, no substantial proportion of the total light transmitted is allowed to flare outwardly beyond the radius c of the effective exposed surface of photocell 25. For this purpose, it has been found desirable that the radius (from axis 18) of the outermost portion of port 70, in its most radially extended condition, be substantially less than the radius of the effective area of the photovoltaic cell. For optimum results, the maximum radius $v$ of the ports should be not greater than:

$$v = \frac{c}{1 + \dfrac{m}{\dfrac{r}{2} + n}}$$

where $c$ represents the radius of the effective surface of the photovoltaic cell; $m$ represents the distance from the front surface of photocell 25 to the axially central plane of the valve (see FIG. 2), the plane of the valve being considered to be the plane in which the two plates 31 and 32 engage one another; $r$ is the radius of the hemispherical portion of light collector 16; and $n$ represents the distance from the transverse plane 71 passing through center 17 (see FIG. 2) to plane 72 of the valve.

In addition to the structural features discussed above, it has been found desirable, in the ideal form of the invention, that the arcuate dimensions of apertures 45 and 46 be so dimensioned as to give the following structural relationships:

(1) If $W_{min.}$ = arcuate width of minimum port (70)
    $W_{max.}$ = arcuate width of maximum port then for optimum results $W_{max.}$ preferably equals $3 \times W_{min.}$ (2) If $A_1$ = maximum arcuate width of aperture 45, then $A_1$ preferably equals $6 \times W_{min.}$ (3) If $A_2$=maximum arcuate width of aperture 46, then $A_1$ preferably equals $2 \times A_2$ (4) Also, "R" preferably equals $$\frac{360°}{P} - A_2$$

where

R=angular degrees of rotation (such as from 49a to 49f in FIG. 6), and
p=number of ports.

In using the device of FIGS. 1 through 6, valve 24 is adjusted to a particular desired setting, by movement of actuating portion 36 of plate 31 to a position opposite a particular one of the markings 40. These markings 40 are desirably a series of different camera shutter times, so that adjustment of the valve to a particular position assumes the use of a particular corresponding camera shutter time. The spacing of detent apertures 38 in portion 37 of plate 32 may be considerably closer than the spacing of positions 49a, 49b, 49c, etc. in FIG. 6, so that a relatively large number of possible settings of the valve are provided. With the valve set to a particular shutter time, ring 14 is adjusted to a proper setting for the film sensitivity being used (this film sensitivity setting being indicated by markings which are located on the back of the meter and are not visible in FIG. 1). The meter is then held in a proper position for taking an incident light reading, and the positioning of pointer 12 relative to scale 14 will give a direct reading on scale 14 of a proper f-stop setting for the camera. The details concerning ring 14 and the associated ring 15 have not been shown or described in detail, since they do not actually constitute any part of the inventive subject matter in the present application.

Figure 7:
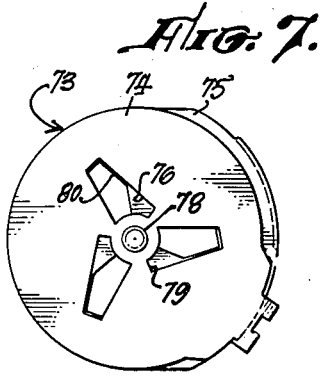
FIG. 7 is a view showing a variational type of valve embodying the invention, and shown in the fully opened condition of the valve.
Figure 8:
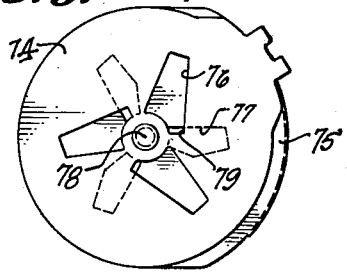
FIG. 8 is a view representing the device of FIG. 7, but showing the valve in its minimum light transmission condition.

FIGS. 7 and 8 represent a variational form of valve assembly which can be substituted for assembly 24 of FIGS. 1 through 6, but which has only a 12 to 1 ratio, rather than a 32 to 1 ratio, between maximum and minimum light transmission conditions. The two plates 74 and 75 of this valve 73 may correspond exactly to plates 31 and 32 of the first form of valve, except as to the shape of apertures 76 and 77. As in the first form of the invention, these apertures are elongated radially with respect to axis 78, and the aperture 76 has a circularly extending projection 79 corresponding to projecting portion 48 of aperture 45 in the first form of the invention. However, the opposite side edges 80 of the apertures 76 and 77 are disposed at a considerably greater angle to one another than are edges 49 and 51, and edges 62 and 64 in FIGS. 4 and 5. Also, the apertures 76 and 77 vary from the previously described apertures in other details, which result in their narrower range of adjustment of the transmission characteristics of the valve.

While the valves disclosed in the present application have their greatest utility in incident light devices, it is also contemplated that these valves may if desired be utilized with reflected light types of light acceptance units, for example a conventional reflected light type of grid. The principal advantage of the valves would then lie in their capacity to produce geometric light transmission progression steps in response to arithmetic steps of rotational adjustment, as discussed above.

I claim:

1. A photographic device comprising a light responsive element, a translucent three dimensional light collector dome through which light passes to said element, and a light valve positioned in the path of said light between said dome and said element and including two thin plates of opaque material in closely proximate face to face relation mounted for relative rotation about a predetermined axis between a maximum light passing position and a minimum light passing position and each having an apertured light passing area, said light passing areas of the two plates being positioned to register with one another to different extents varying in accordance with the relative rotary settings of the two plates to thereby vary the effective light passing area of the valve, said apertured areas of the two plates being shaped to extend through a substantial radial distance with respect to said axis, one of said apertured areas having a portion at substantially its radially inner end projecting circularly toward the other of said areas and positioned to register with substantially the radially inner end thereof in said minimum light passing position of the plates and while the radially outer portions of the apertured areas remain out of registry, and said radially outer portions of the apertured areas being positioned to move progressively into registry upon relative rotation of the sections toward said maximum light passing position, said one apertured area being elongated radially and having a first essentially straight side edge extending substantially radially with respect to said axis, and having a second essentially straight side edge spaced laterally from said first side edge and converging slightly theretoward as the two advance radially outwardly, said second side edge having a radially inner portion which continues to a point at which it is relatively close to but offset laterally from said axis and forms a side of said circularly projecting portion of said one area, said circularly projecting portion having another side edge generally parallel to said first mentioned edge of said one aperture, said one apertured area having a radially outer edge extending between outer ends of said first and second edges, said one apertured area having a radially inner edge extending laterally from said first edge to said circularly projecting portion of said one apertured area.

2. A device as recited in claim 1, in which said other apertured area is shaped substantially the same as said one area except that it does not have said projecting portion and instead has a short additional edge extending substantially radially from said inner edge to the inner end of said second side edge.

3. A device as recited in claim 2, in which said radially outer edges of both apertured areas are curved arcuately about said axis and of a common radius, said radially inner edge of said one apertured area being shaped to first curve arcuately about said axis at a predetermined radius and then extend along a straight tangent line as it advances toward said circularly projecting portion of said one apertured area, and the corresponding inner edge of said other apertured area being curved arcuately about said axis at said predetermined radius.

4. A photographic light responsive device comprising a translucent convex light collecting shell having a substantially hemispherical portion, a light sensitive element positioned behind said shell and disposed essentially transversely of the central axis of the shell, and a thin light valve interposed axially between said shell and said element and comprising two thin essentially parallel closely proximate plates mounted for relative rotary adjustment about a predetermined axis, said plates being formed of opaque material and containing apertures which move into and out of registry upon relative rotation of the plates to vary the effective sizes of the apertures, said apertures being so shaped and positioned that the radial distance from said axis to the registering light passing portions of said apertures which are farthest from said axis, is never, in any relative setting of the plates, more than:

$$\frac{c}{1+\frac{m}{\frac{r}{2}+n}}$$

where c presents the maximum radial distance from said axis of the effective light receiving surface of said light responsive element, m represents the axial distance between the plane of the valve and the front surface of said element, r represents the radius of said hemispherical portion of the shell, and n represents the axial distance from the base of said hemispherical portion of the shell to the plane of the valve.

5. A photographic light responsive device as recited in claim 4, in which said apertures include a first apertured area in one of said plates and a coacting second apertured area in the other plate, one of said apertured areas having a portion at substantially its radially inner end projecting circularly toward the other of said areas and positioned to register with substantially the radially inner end thereof in the minimum light passing condition of the valve and while the radially outer portions of the apertured areas remain out of registry, said radially outer portions of the apertured areas being positioned to move progressively into registry upon relative rotation of the sections toward their maximum light passing positions.

6. A photographic device comprising a light responsive element, a translucent three dimensional light collector dome through which light passes to said element, and a light valve positioned along the path of said light between said light collector dome and said element, said valve including two thin plates of opaque material in closely proximate face to face relation mounted for relative rotation about an axis between a maximum light passing position and a minimum light passing position and each having an apertured light passing area, said light passing areas of the two plates being positioned to register with one another to different extents varying in accordance with the relative rotary settings of the two plates to thereby vary the effective light passing area of the valve, said apertured areas of the two plates being shaped to extend through a substantial radial distance with respect to said axis, one of said apertured areas, in a first of said plates, having a portion at substantially its radially inner end projecting generally circularly with respect to said axis toward the other of said areas, in the second of said plates, and positioned to register with substantially the radially inner end of said other apertured area in said minimum light passing position of the plates and while the radially outer portions of the apertured areas remain out of registry, and said radially outer portions of the apertured areas being positioned to move progressively into registry upon relative rotation of the sections toward said maximum light passing position.

7. A device as recited in claim 6, in which said one apertured area is elongated in a predetermined general direction which extends essentially radially of the axis of relative rotation of said plates for most of the length of that apertured area, said generally circularly projecting portion of said one apertured area being positioned to project in generally the same direction as that in which said one apertured area is elongated but at a location offset laterally from said axis in a manner such that said portion projects primarily circularly about said axis.

8. A device as recited in claim 6, in which both of said apertured areas are elongated primarily radially with respect to said axis, and said circularly projecting portion of said one apertured area projects toward said other apertured area in a direction extending generally transversely of said other area when the plates are in said minimum light passing position.

9. A device as recited in claim 6, in which at least one of said apertured areas has an edge which is curved arcuately about said axis.

10. A device as recited in claim 6, in which said two apertured areas have radially inner edges and radially outer edges which are curved arcuately about said axis and which essentially coincide in said maximum light passing position of the plates.

11. A device as recited in claim 6, in which one of said apertured areas has a first side edge extending substantially directly radially, and has a second side edge spaced laterally from and generally parallel to said first edge.

12. A device as recited in claim 6, in which one of said apertured areas has a first side edge extending substantially directly radially, and has a second side edge spaced laterally from said first edge and which first diverges away from and then converges toward said first edge as the two advance radially outwardly.

References Cited in the file of this patent

UNITED STATES PATENTS

| | | |
|---|---|---|
| 2,021,232 | Fassin | Nov. 19, 1935 |
| 2,186,203 | Centeno | Jan. 9, 1940 |
| 2,260,702 | Collins | Oct. 28, 1941 |
| 2,372,937 | Dirksen et al. | Apr. 3, 1945 |
| 2,587,601 | Crandell et al. | Mar. 4, 1952 |
| 2,744,200 | Taylor | May 1, 1956 |
| 2,824,696 | Norwood | Feb. 25, 1958 |
| 2,913,955 | Norwood | Nov. 24, 1959 |